UNITED STATES PATENT OFFICE.

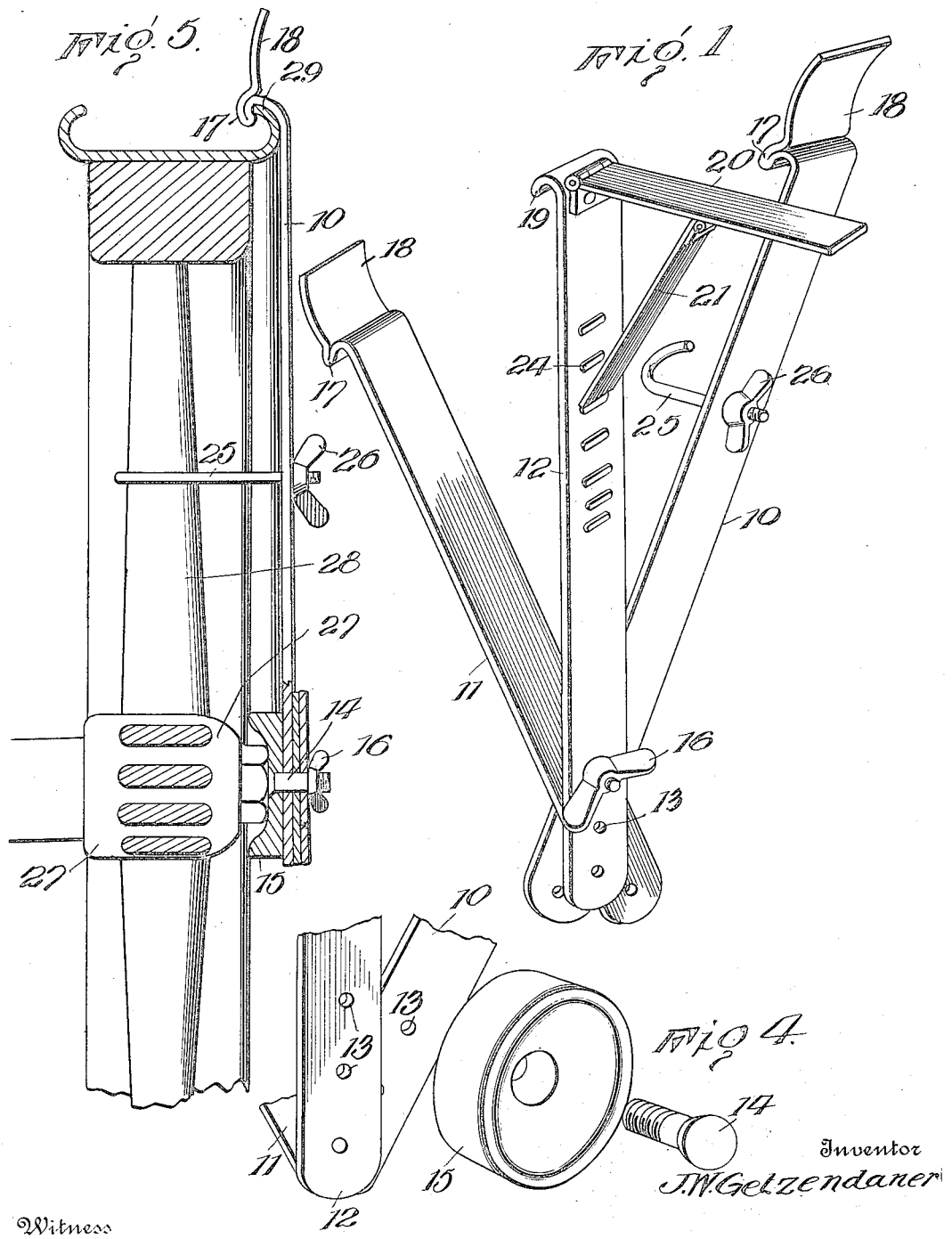

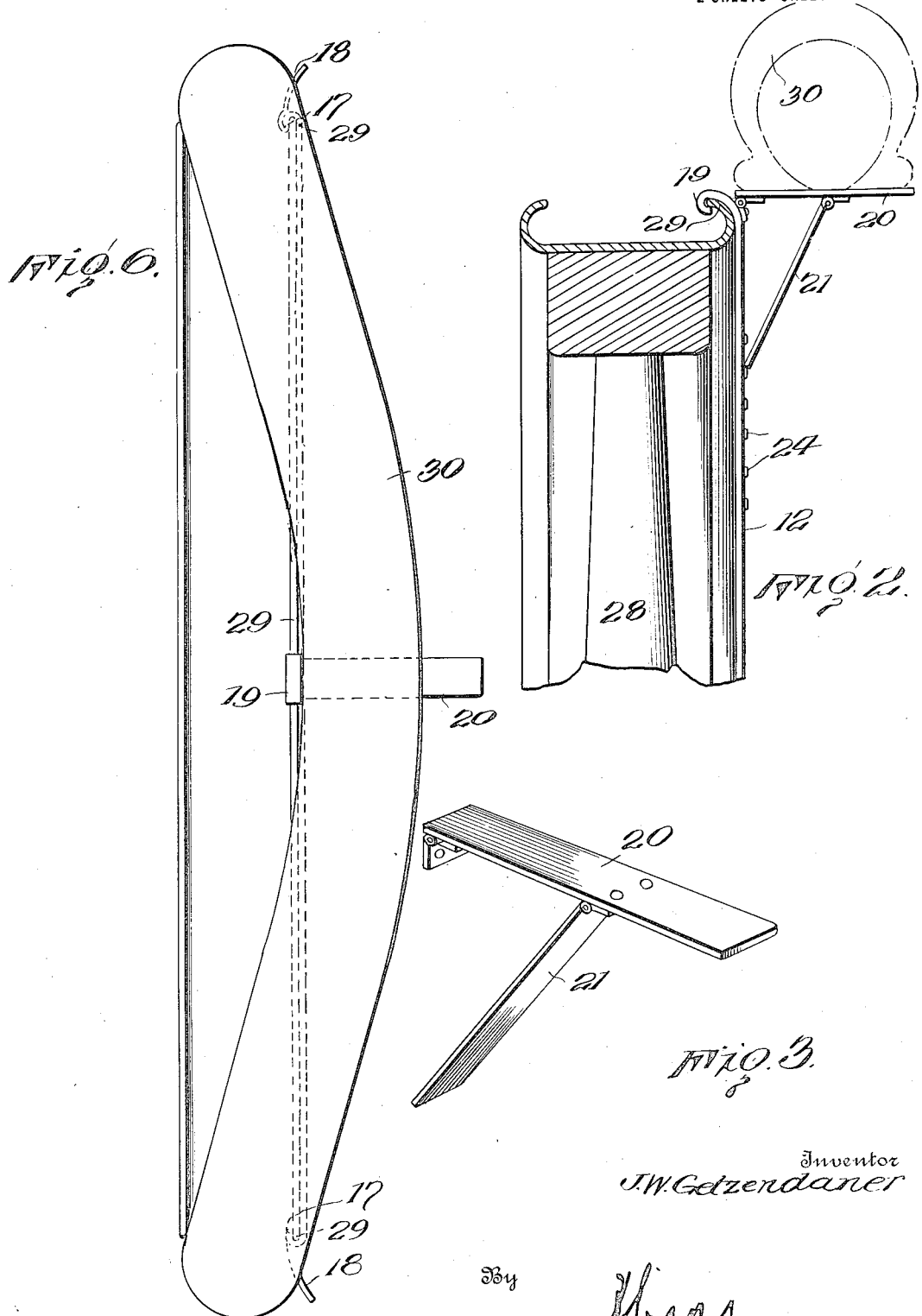

JOHN WM. GETZENDANER, OF POLO, ILLINOIS.

TIRE-REPLACER.

1,223,689. Specification of Letters Patent. Patented Apr. 24, 1917.

Application filed June 6, 1916. Serial No. 102,083.

*To all whom it may concern:*

Be it known that I, JOHN WILLIAM GETZENDANER, a citizen of the United States, residing at Polo, in the county of Ogle and State of Illinois, have invented certain new and useful Improvements in Tire-Replacers, of which the following is a specification.

This invention contemplates an improved tire replacer and has as its primary object to provide a simple and efficient device of this character which may be readily employed in connection with substantially any conventional type of tire carrying wheel for easily and quickly placing a tire upon the wheel.

The invention has as a further object to provide a device of this character which will be adjustable to fit upon wheels of various diameters.

And a still further object of the invention is to provide a device of this character having arms adjustable for urging the tire back onto the wheel and wherein the said arms will each be formed to provide a tool which may be used for removing the tire from the wheel.

Other and incidental objects will appear as the description proceeds and in the drawings wherein I have illustrated the preferred embodiment of the invention and wherein similar reference characters designate corresponding parts throughout the several views, Figure 1 is a perspective view of my improved device particularly showing the tire receiving bracket carried thereby.

Fig. 2 is a fragmentary side elevation showing the device in connection with a conventional type of wheel and tire which are illustrated in section, this view particularly bringing out the manner in which the bracket is adapted to support the tire for directing the tire back onto the wheel, Fig. 3 is a perspective view showing the tire receiving bracket detached, Fig. 4 is a fragmentary perspective view particularly showing the socket member carried by the device for engagement with the hub of a wheel, Fig. 5 is a fragmentary sectional view illustrating the manner in which the device is connected to a wheel, and Fig. 6 is a plan view particularly showing the manner in which the device is employed for directing the free side of the tire back onto the wheel.

In carrying out the invention, I employ a plurality of coacting arms 10, 11 and 12 respectively, preferably each formed from a suitable strip of flat metal. Adjacent their inner extremities, the arms are each provided with a series of longitudinally spaced openings 13 adapted to be brought into register for receiving a bolt or other suitable fastening device 14 detachably connecting the said arms. Removably fitted upon the inner end of the said bolt is a hub engaging member or socket 15. This socket may be constructed of any suitable material and is preferably of conical formation to fit over the hub caps of different types of wheels. Mounted upon the outer end of the bolt 14 is a wing nut 16 which may be adjusted upon the said bolt for clamping the inner ends of the arms 10, 11, and 12 together.

The arms 10 and 11, adjacent the outer extremities thereof, are bent laterally or otherwise formed to provide inwardly directed hooks or attaching elements 17 and projecting from the adjacent terminals of the said arms are upwardly directed stop guards or lugs 18 longitudinally curved outwardly to fit against the side of a tire. Formed on the outer extremity of the arm 12 is a hook 19. Swingingly connected in any approved manner to the outer side of the arm 12 adjacent the upper extremity thereof, is a tire receiving bracket 20 to which is swingingly connected at a point about midway the ends thereof, a supporting arm 21. Formed on the arm 12 to project laterally from the outer side thereof is a series of longitudinally spaced lugs or stops 24 and the inner end of the arm 21 is adapted to selectively engage these stops for adjustably supporting the arm 20 at different elevations with respect to the arm 12. It will be observed in this connection, that the arms 20 and 21 provide a bracket and this bracket is adapted to receive a tire as shall be presently described.

Adjustably connected to the arm 10 is an attaching hook 25 which, at its inner end, is bent to engage around the spokes of a wheel and at its outer end, is provided with a wing nut 26.

In order that the operation of the device may be thoroughly understood, I have, in the drawings, shown the replacer in connection with a conventional type of wheel having a hub 27, spokes 28, and a tire receiving rim having coacting tire engaging flanges, the outermost of which is designated 29. A pneumatic tire for the wheel is conventionally shown at 30, this tire being adapted to fit within the rim of the wheel to engage with the said flanges. As is well known, a pneumatic tire may be easily fitted onto a wheel rim to assume a position, as illustrated in Fig. 6 of the drawings, with a portion of the tire free at one side of the wheel. However, it is very difficult to move this free portion of the tire onto the wheel to engage within the rim thereof. The present invention is particularly designed to engage the wheel and tire for shifting this free portion of the tire onto the wheel. In applying the device, the hook 17 of the arm 10 is first engaged with the flange 29 of the wheel rim adjacent the point at one side of the wheel where the tire begins to leave the rim. The socket member 15 is then fitted over the cap of the hub 27 and the arm 10 engaged with the bolt 14. The hook 17 of the arm 11 is then engaged with the flange 29 adjacent the point where the tire begins to leave the wheel rim, at the opposite side of the wheel, and the said arm is then connected with the bolt 14. The outer extremity of the arm 12 is then inserted beneath the free portion of the tire and the hook 19 of the said arm engaged, as particularly shown in Fig. 6, with the rim 29 at a point between the outer ends of the arms 10 and 11, when the inner end of the arm 12 is then connected to the bolt 14. In this connection, it should be stated that the bracket arm 20, in the normal position thereof, will swing downwardly upon the arm 12 so that the said last mentioned arm may be applied to the wheel rim as just previously described. All of the arms are connected with the bolt 14, the wing nut 16 is then applied to hold the said arms upon the bolt and the hook 25 is connected with one of the spokes 28 of the wheel for holding the socket member 15 in engagement with the hub cap.

It will now be noted that owing to the presence of the series of openings 13 in the arms 10, 11, and 12, the radius between the bolt 14 and the hook 17 may be varied so that the device may thus be adjusted to fit wheels of different diameters and while I have indicated that the said arms are preferably provided with openings 13, still, I do not wish to be limited to this specific arrangement since it will be seen that the arms may be slotted or otherwise formed to provide an adjustable connection with the bolt 14 without in the slightest departing from the spirit of the present invention.

When the device is thus applied, as just previously set forth, the stop guards 18 will project radially from the flange 29 to engage the outer side of the tire and prevent the portion thereof already fitted into the rim of the wheel from working off during the operation of fitting the free portion of the tire into the rim. This operation is accomplished by lifting the bracket arm 20 beneath the free portion of the tire to elevate the said portion of the tire above the flange 29 when the arm 21 is positioned to coöperate with one of the lugs 24 for supporting the arm 20 at adjustment. The arm 11 is then swung circumferentially of the wheel toward the arm 12 when the stop guard 18 of the arm 11 will ride over the adjacent side of the tire to force the free portion thereof into the rim.

It will thus be seen that I provide a very simple and efficient construction for the purpose set forth and a device which may be employed in connection with substantially any conventional type of tire carrying wheel. Furthermore, it is to be observed that the arms 10 and 11 may be detached from the bolt 14 and each employed as a tool for removing the tire. When so used, the stop guards 18 are adapted to provide hooks for engaging beneath the tire flanges to release the said flanges from the flanges of the wheel rim in the well known manner.

Having thus described my invention, what I claim and desire to secure by Letters Patent is:

1. A device of the character described including coacting arms, attaching elements carried thereby, a tire engaging bracket carried by one of said arms, and stop guards carried by the other of said arms and disposed for engagement with a tire resting upon said bracket with one of said last mentioned arms fixed and the other of said last mentioned arms movable toward the said first mentioned arm for shifting a tire longitudinally upon the said bracket.

2. A tire replacer for vehicle wheels including coacting arms, means pivotally connecting the said arms at their inner extremities with the arms extending radially therefrom and supported to swing about the wheel hub, attaching elements carried by the outer extremities of said arms for engagement with the wheel tire to move around the tire, a tire receiving bracket mounted upon one of the arms and disposed to project laterally therefrom, and a stop guard carried by the free extremity of the other of said arms for engagement with a tire upon the movement of said last mentioned arm toward said first mentioned arm to shift the tire inwardly upon the bracket.

3. A tire replacer for vehicle wheels including coacting radial arms pivotally connected at their inner extremities, attaching elements carried by the outer extremities of said arms for engagement with a wheel tire to move around the tire, a cupped socket member arranged at the inner extremities of the arms and formed to fit over the wheel hub for supporting the said arms to swing about the hub, a tire receiving bracket mounted upon the free extremity of one of said arms and disposed to project laterally therefrom, and a stop guard carried by the free extremity of the other of said arms and adapted for engagement with a tire upon the movement of said last mentioned arm toward the said first mentioned arm for shifting the tire inwardly upon the bracket.

4. A device of the character described including coacting arms, means adjustably and pivotally connecting the inner extremities of said arms with the arms extending radially therefrom, attaching elements carried by the outer extremities of the arms, a tire receiving bracket adjustable upon one of said arms to project laterally from the free extremity thereof, and a stop guard carried by the free extremity of the other of said arms and disposed for engagement with a tire with said last mentioned arm movable toward said first mentioned arm for shifting the tire inwardly upon said bracket.

5. A device of the character described including coacting radial arms pivotally connected at their inner extremities and bent at their outer extremities to provide attaching hooks with the adjacent terminal of one of said arms extended to provide an upstanding stop guard, and a tire receiving bracket mounted upon the other of said arms and disposed to project laterally therefrom with the said second mentioned arm movable toward said first mentioned arm to engage the said stop guard with a tire to shift the said tire inwardly upon the bracket.

6. A device of the character described including coacting radial arms pivotally connected at their inner extremities, attaching elements carried by the outer extremities of said arms, a tire receiving bracket swingingly connected to one of said arms, an arm disposed for adjustable engagement with said first mentioned arm for supporting the bracket to project laterally therefrom, and a stop guard carried by the other of said arms and arranged for engagement with a tire upon the movement of said last mentioned arm toward said first mentioned arm for shifting the tire inwardly upon the bracket.

7. A device of the character described including a plurality of coacting radial arms pivotally connected at their inner extremities and bent at their outer ends to provide attaching hooks for engagement with a wheel rim with the said hooks movable around the rim, upstanding stop lugs carried by the free extremities of certain of said arms, and a bracket mounted upon the free extremity of the other of the said arms and disposed to project laterally therefrom in a direction opposite to said hooks with one of said first mentioned arms movable to engage the stop lug carried thereby with a tire for shifting the tire inwardly upon the bracket with the stop lug carried by the other of said arms holding the tire against displacement.

In testimony whereof I affix my signature.

JOHN WM. GETZENDANER. [L. S.]